Q. R. MURPHY.
CYLINDER REBORING MACHINE.
APPLICATION FILED JULY 3, 1916.
1,241,543.
Patented Oct. 2, 1917.
2 SHEETS—SHEET 1.
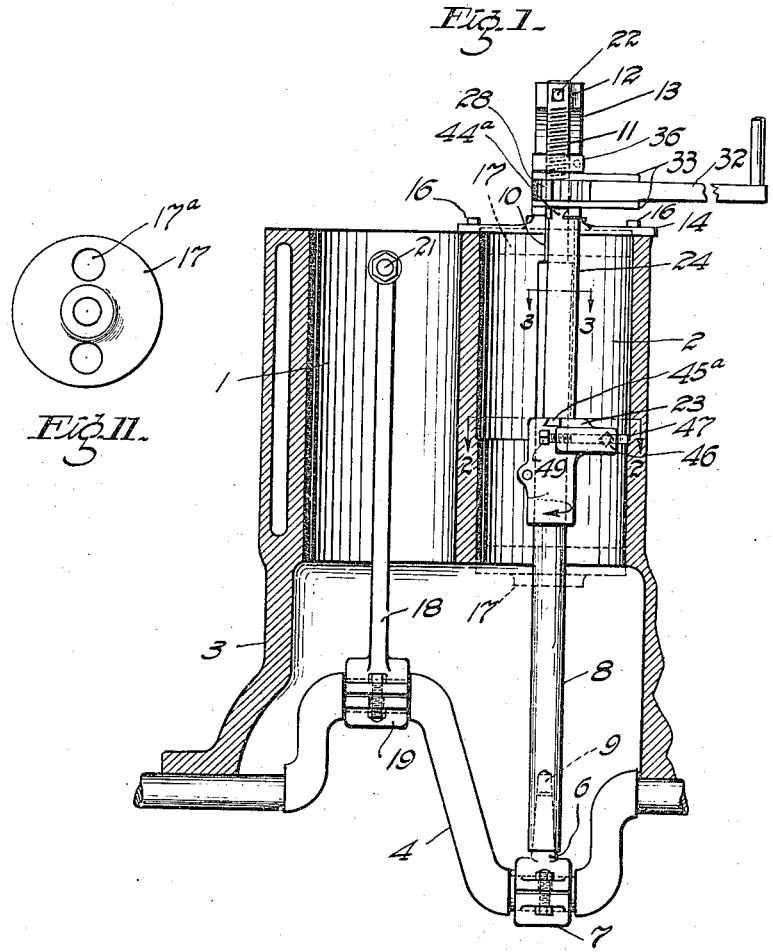
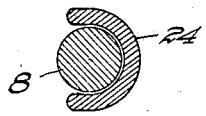
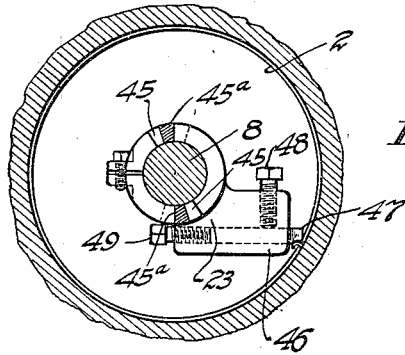
Witness
Inventor
Q. R. Murphy
By
Attorney Q. R. MURPHY.
CYLINDER REBORING MACHINE.
APPLICATION FILED JULY 3, 1916.
1,241,543.
Patented Oct. 2, 1917.
2 SHEETS—SHEET 2.
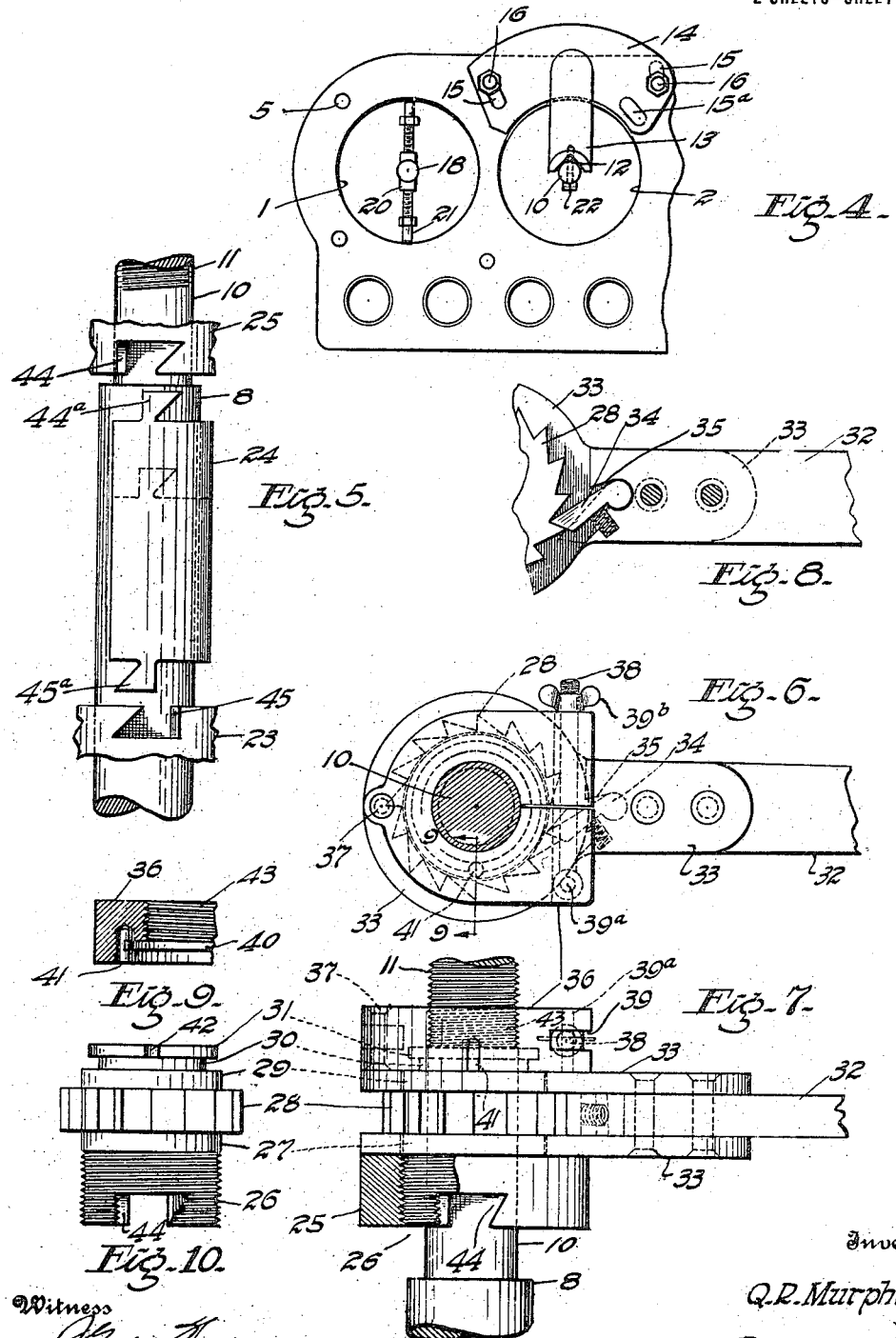

UNITED STATES PATENT OFFICE.

QUILLAIN R. MURPHY, OF BIRMINGHAM, ALABAMA, ASSIGNOR OF ONE-HALF TO ROBERT D. MILLS, OF BIRMINGHAM, ALABAMA.

CYLINDER-REBORING MACHINE.

1,241,543.

Specification of Letters Patent.

Patented Oct. 2, 1917.

Application filed July 3, 1916. Serial No. 107,404.

*To all whom it may concern:*

Be it known that I, QUILLAIN R. MURPHY, a citizen of the United States of America, residing at Birmingham, in the county of Jefferson and State of Alabama, have invented certain new and useful Improvements in Cylinder-Reboring Machines, of which the following is a specification.

My invention relates to an apparatus which is particularly designed for the boring of automobile cylinders, and has for its chief object to design an apparatus that can be mounted in the motor cylinders and operated to rebore them without requiring the engine to be removed from its bearings.

Heretofore, in apparatus designed for the reboring of cylinders, and especially automobile cylinders, it has been necessary to disconnect the cylinders from their base and, after the reboring operation, to remount them on their base. This is objectionable not only because it involves considerable time and labor in dismounting and remounting the motor, but more especially because of the difficulty of properly and accurately centering the cylinders in exact alinement on their base so that the motor will work with the same smoothness as when originally assembled.

In my present invention the motor is left mounted on its base, the cylinder heads are removed, and a centering shaft is mounted in the axial center of the cylinder to be bored by means of suitable centering devices, the inner end of the shaft taking its bearing on a taper pin adjustable on the crank shaft and the upper end of the centering shaft taking its bearing on an adjustable bearing block on the upper end of the cylinder. In order that the crank shaft may be used as a bottom bearing for the centering shaft, it is necessary to provide means to hold it rigidly against movement and to this end I have designed a novel means for quickly and effectively clamping the crank shaft against movement.

Another feature of my invention relates to the adaptation of the reboring machine to work where the head room is frequently very limited. To meet this condition the boring head, which both slides and turns on the centering shaft, is connected by interchangeable coupling sleeves of varying lengths to a ratchet drive and screw feed mechanism. These interchangeable driving sleeves are preferably half circular in shape so that they may be applied as the reboring operation proceeds without disturbing the centering shaft and they increase in length by a distance approximately equal to the effective length of the feed screw.

Another feature of my invention relates to its adaptability to boring the rear cylinder when there is a minimum of both head and side room. I arrange the top bearing for the centering shaft so that for this inner cylinder it can be shifted into position crosswise of the motor and bolted into position and by working the ratchet from the side and inserting longer driving sleeves as the boring proceeds, I can rebore any cylinder in automobile motors as now designed. The interchangeable coupling sleeves are provided with novel means for quick detachment and secure coupling with the driving and feed mechanism at one end and the boring head at the other end.

My invention also comprises the novel features of construction and arrangements of parts, which in their preferred embodiment only are hereinafter more particularly described, and which are set forth in the appended drawings, in which:—

Figure 1 is a vertical sectional view through two motor cylinders, the boring apparatus being shown in side elevation in operating position.

Fig. 2 is a cross sectional view of the boring apparatus taken on the line 2—2 of Fig. 1.

Fig. 3 is a cross section on the line 3—3 of Fig. 1.

Fig. 4 is a plan view of Fig. 1 with the ratchet drive mechanism removed.

Fig. 5 is an enlarged detail view of a portion of the centering shaft showing the interchangeable driving sleeve uncoupled from its driving and driven elements.

Figs. 6 and 7 are views showing the ratchet drive in plan and side elevation, respectively.

Fig. 8 is a detail view of the ratchet pawl.

Fig. 9 is a detail sectional view taken on the line 9—9 of Fig. 6 and showing the pin carried by the split nut for keying it to the collar of the ratchet wheel.

Fig. 10 is a detail view of the ratchet wheel.

Fig. 11 is a plan view of one of the centering blocks.

Similar reference numerals refer to similar parts throughout the drawings.

In the preferred embodiment of my invention, which alone is illustrated, I show my invention adapted for reboring engine cylinders 1 and 2 of automobile motors, the cylinders being cast in block integral with the base 3 in which is mounted a crank shaft 4 having, in the manner well understood, crank pins turned thereon for connection with the piston rods which with the pistons have been removed. The cylinder heads also have been removed, the same having been attached to the top ends of the cylinders by bolts passing through the bolt holes 5 in the manner well understood. The cylinder 2 is in the process of being rebored and its crank pin is shown in lowered position with the taper centering pin 6 mounted thereon by a clamp collar 7. A centering shaft 8 has a taper bore 9 in the center of its bottom end which is adapted to fit over and be centered by the pin 6. The shaft 8 itself is round and of uniform diameter until it reaches a point near the top end of the cylinder where it has a reduced end 10 (see Fig. 5) provided with the feed screw threads 11 which continue to a point near its upper end where there is provided a transverse bolt hole to receive a bolt by means of which it is adapted to be made fast in a V-shaped bearing 12 at the upper end of an overhanging arm 13 mounted upon a curved base plate 14. This base 14 is provided with elongated slots 15 and 15ª which receive cap screws 16 which are screwed into the holes 5 opposite the cylinder 2. The inner edge of the base 14 is cut away on a curve corresponding to the interior curve of the cylinder so that, when attached, it will not obstruct the latter overhead. In order to center the shaft 8 in the cylinder 2, I first slip taper blocks 17, as shown in dotted lines Fig. 1, on the ends of the shaft and provide them with holes 17ª for a wrench to be passed through to engage and tighten the nuts of the clamp collar 7 after the pin on the latter has been centered with the centering of the shaft. The base plate 14 is adjusted by means of its elongated slots 15 until its bearing 12 engages the top of the shaft and is then clamped in position on the cylinder.

In order to hold the crank shaft 4 against movement after this centering operation, I provide a rod 18 which is connected by a clamp collar 19 to the crank pin in line with the cylinder 1 and at the upper end of this rod I provide a threaded cross arm 20 which is rigid therewith and has screwed on its ends sleeves 21 with their outer faces rounded to conform to the curvature of the cylinder. This cross arm is set at right angles to the crank pin and it will be evident by running the sleeves 21 out into engagement with the cylinder walls, the T-bar structure will be held against angular movement and so will hold the crank shaft against angular movement. I provide a bolt hole in the top of the shaft to receive a screw 22 by which it can be connected in its bearing 12 after the boring mechanism has been mounted thereon.

Having centered the shaft 8 and its top and bottom bearings in relation to the cylinder 1, I disengage the shaft from its bearings and release the taper blocks 17, slipping off the lower block and lifting out the upper block with the shaft from the cylinder. I then mount a cutter head 23 and its driving mechanism on the shaft and mount the latter on its bottom bearing 6 and bolt it to its top bearing 12. The head 23 is free to turn and slide on the shaft and is connected by means of a semi-circular and interchangeable driving sleeve 24 to a nut 25 and to the threaded lower end 26 of a collar 27 on which the nut is screwed. The collar 27 is left plain above the threads to form a bearing and is preferably formed integral with a ratchet wheel 28 (see Fig. 7), which has a collar 29 above it. I cut an annular groove 30 about this upper collar 29 so as to leave an annular flange 31. A ratchet arm 32 has riveted to each side plates 33 which are spaced to receive the ratchet wheel between them and have circular openings therein so as to fit and turn on the collars 27 and 29 on which they are mounted before being riveted to the handle. A spring-pressed pawl 34 is mounted in a countersunk recess 35 in the inner end of the handle 32 and is adapted to engage the teeth of the ratchet wheel 28. The nut 25 is screwed on to reinforce the lower or driving end of the ratchet collar 26. A split feed nut 36 is provided and adapted to mesh with the feed threads on the shaft end 10. The sections of the feed nut are hinged together by a pin 37, their free ends being drawn together by a bolt 38 which is seated in transverse notches 39 which extend in alinement through the free ends of the feed nut. The bolt is pivoted by a pin 39ª to one half of the feed nut and a wing nut 39ᵇ on its end engages the other feed nut section. As shown in Fig. 8 the feed nut is provided with a countersunk groove 40 to receive the ratchet wheel flange 31 and to interfit in the groove 30 and I interlock the nut with the ratchet preferably by a pin 41, see Fig. 9, driven into the lower end of the nut so as to traverse the groove 40 and to be received in a notch 42 in the ratchet flange 31.

The semi-cylindrical sleeve 24, forming the interchangeable connection between the ratchet drive and the screw feed mechanism on one hand and the boring head 23 on the other, is made semi cylindrical so that it can be removed laterally from the shaft 8 without necessitating the removal of the ratchet mechanism or the disconnection of the shaft from its bearings. In order to provide for a connection between the ends of the driving sleeve 24 and the driving and driven elements, I provide as a preferred means in the end 26 of the collar on the ratchet and in the reinforcing nut 25 thereon a pair of dove-tail notches 44, these notches being formed after the nut has been run on and each having one sloping side face. The sloping faces of each pair of notches are inclined in reverse directions. A similar pair of notches 45 are provided in the cutter head 23 and these likewise have reversely sloping faces. As seen in Fig. 5, the alining notches 44 and 45 are reversed so that the undercut portion of one faces to the right and the other to the left. The semi-circular sleeve 24 is provided at each end with a pair of dove-tail lugs 44ª and 45ª which are so shaped that they can be slipped endwise into the notches 44 and 45 and when so inserted they will have one beveled face which will slope in the direction of the beveled face in the notch receiving it. By this arrangement the semi-circular sleeve will interfit and interlock with the boring head and the ratchet wheel and will then turn with the latter about the centering shaft, serving to both rotate and feed the center head. After the head has been fed down the length of the threads 11, by grasping the sleeve 24 and turning it so that its lugs can be disengaged from the notches 44 and 45, a longer sleeve can be inserted after the split nut has been opened and the nut and ratchet parts together have been slipped up to the top of the threads 11 on the centering shaft. The operation can then be repeated and driving sleeves of increasing length inserted until the whole cylinder has been bored.

It will be noted in Fig. 2 that the boring head is provided with a tool holder 46 which sets the tool 47 so as to make a draw out, the tool being held to set position by adjusting screws 48 and 49. Such an arrangement of the cutting tool gives a much smoother action and avoids any tendency to chatter which might result from a tool set at a forward or radial inclination.

The crank shaft forms the most convenient support for the bottom bearing pin in all types of motors, but I wish it understood that my invention contemplates the mounting of the bottom bearing pin on any suitable bearing which is available without requiring the cylinder to be removed. Where full head room exists, the step by step center feed may be dispensed with and the general practice in boring machines followed in reference to the feed of the cutter. These and other changes which do not depart from the claim in principle may be made.

Having thus described my invention, what I claim as new and desire to secure by Letters Patent, is:—

1. A cylinder reboring device comprising a cutter carrying shaft, a top bearing therefor adapted to be attached on the cylinder and a bottom bearing therefor adapted to be attached on the engine crank shaft, means to adjust said bearings to center said shaft in the cylinder, means to hold the crank shaft against movement, and boring mechanism on said shaft.

2. An apparatus for reboring a cylinder comprising in combination, a cutter carrying shaft, a centering bearing for the lower end of the cutter shaft, means to mount said bearing on the engine crank shaft, a top bearing, means to adjustably mount the top bearing on the cylinder, means to center the cutter shaft and its bearings in axial alinement with the cylinder, and means to hold the crank shaft against movement, substantially as described.

3. In an apparatus for reboring cylinders, in combination, means for engaging and holding the engine crank shaft against movement, a cutter carrying shaft, a top bearing for the cutter shaft adapted to be mounted on the cylinder, a bottom bearing for the cutter shaft adapted to be mounted on the crank shaft in line with the cylinder, means to center the cutter carrying shaft and its bearings in the cylinder, means for making fast the bearings in their adjusted positions, and boring mechanism mounted on said cutter shaft.

4. A device for reboring cylinders comprising a non-rotatable cutter carrying shaft, adjustable bearings for the shaft, means for alining the shaft and its bearings axially with the bore of the cylinder, a cutter head rotatable on and adjustable along the shaft, a feed and drive mechanism for the cutter head, and a detachable driving connection between the feed mechanism and the cutter head.

5. In a device for reboring cylinders, a centering shaft having a feed screw at its upper end, means to mount said shaft in axial alinement with the cylinder bore, a screw feed drive means for the cutter head mounted on the threaded end of said shaft, a cutter head mounted to turn on and slide along said shaft, and detachable driving connections between the head and its operating mechanism and rotatable about said shaft, substantially as described.

6. A device for reboring cylinders comprising a fixed centering shaft, means to mount the shaft in axial alinement with the bore of the cylinder, a rotatable driving mechanism for the cutter head mounted on the upper end of said shaft, screw means to give said driving mechanism a limited feed axially along the shaft, a cutter head mounted to rotate on and slide along the shaft, and detachable driving connections disposed between said head and driving mechanism and rotatable about said shaft, substantially as described.

7. In a cylinder reboring mechanism, the combination of a cutter carrying shaft and means to mount it in axial alinement with the bore of a cylinder, a cutter mounted to rotate on and slide along said shaft, a feeding and driving mechanism mounted on one end of the shaft and having a feeding travel equal to a part only of the length of said shaft along which the cutter is adjustable, driving connections, between the cutter head and said feed and driving mechanism, which are detachable to permit a connection of suitable length to be used as the work proceeds, said connections being U-shaped in cross section to fit about and be laterally removable from said shaft.

8. The combination, in a cylinder reboring mechanism, of a boring head, a centering guide shaft for the head, adjustable bearings at each end of the cylinder to be bored to mount said shaft in the axial center of the cylinder, a feed and drive means for the boring head, feed means being adapted to adjust the head to only a fraction of its normal working travel, detachable driving connections of gradually increasing length adapted successively to connect said feed means and boring head, said feed means comprising a feed nut and a feed screw therefor adapted to give the nut a travel substantially equal to the difference in length between successive driving connections.

9. In a cylinder reboring device, a non-rotatable shaft, means to mount the shaft concentric with the axial center line of a cylinder to be bored, a boring head mounted to turn and slide on the shaft, a feed screw at the top of the shaft, a nut in threaded engagement with said screw, a ratchet means to turn the nut, and a curved sleeve detachably connected to the nut and head and forming a driving connection between them.

10. In a cylinder reboring device, a non-rotatable shaft, means to mount the shaft concentric with the axial center line of a cylinder to be bored, a boring head mounted to turn and slide on the shaft, a feed screw at the top of the shaft, a nut in threaded engagement with said screw, a curved sleeve detachably connected to the nut and head and forming a driving connection between them, said sleeve and the parts it connects having complementary undercut lugs, and sockets adapted to permit an endwise disengaging movement of the sleeve in uncoupling.

11. In a cylinder boring mechanism, a boring head, a fixed bearing shaft therefor on which it turns and slides, a feed and drive mechanism, and a semi-cylindrical coupling sleeve having at each end lugs that are reversely undercut on one side, and said head and drive mechanism comprising elements in which are sockets undercut to correspond with said lugs and adapted to permit the insertion of the lugs thereinto by an endwise movement of the sleeve on said shaft.

12. In a cylinder reboring means, a boring head, a guide therefor, means to mount the guide concentric with the axial center of a cylinder to be bored, a screw feed means for the head which has an effective travel partway only of the length of the boring head guide, means to lengthen the connection between the head and its feed means after the latter completes the full length of its advancing travel, a split nut forming part of said screw feed means, and means to open the nut to effect a quick return of the feed means to its starting point.

13. In a cylinder reboring means, a boring head, means to guide it, driving means to rotate it, means to feed it step by step, and means to increase the length of the connection between the head and its feed means after each step in its feed.

14. Mechanism to rebore a cylinder while mounted on its base which comprises in combination, a cutter carrying shaft adapted to pass through a cylinder to be bored concentric with its axis, a bottom bearing for the shaft adapted to be inserted through the cylinder and comprising means whereby it can be adjustably mounted in the cylinder base below the cylinder, a top bearing for the shaft adapted to be mounted on the cylinder, a cutter, and means to turn and feed the cutter.

15. In a cylinder reboring device, a shaft having its upper end reduced and threaded, removable centering blocks mounted on the bottom and reduced top of the shaft and adapted to center it in a cylinder, bearings to hold said shaft in its adjusted position, a sectional feed nut working on the reduced end of the shaft and adapted to be opened to provide for its rapid return movement, a cutter mechanism rotatable on the shaft, driving connections between the nut and cutter mechanism, and a ratchet drive to rotate and feed the nut.

16. In a reboring apparatus for cylinders, a cutter carrying shaft, a bottom bearing for the shaft adjustably mounted on a fixed support below the cylinder, means to fasten the bearing, centering blocks mounted on and removable from the shaft and adapted to enter the cylinder ends and center the shaft, there being holes in said blocks to provide for the insertion of a tool to make the bottom bearing fast when properly adjusted.

17. In a reboring apparatus for cylinders, a cutter carrying shaft having a taper hole in its bottom end, a taper pin having a clamp collar adapted to be engaged and to be adjustable on a fixed bottom bearing in the cylinder base, a top bearing having an overhanging arm with a V-groove bearing for the top of the shaft, means to fasten the shaft to said bearing, a cutter and its feed and drive mechanism detachably mounted on said shaft.

18. In a cylinder reboring mechanism, a boring mechanism comprising a cutter carrying shaft, a bottom bearing for the shaft, a top overhung bearing comprising an arched standard and a quadrant shaped base upon which the standard is mounted and which is slotted to form elongated holes disposed to be positioned over the adjacent bolt holes for the cylinder head and permit the base to be set lengthwise of the cylinders or crosswise between cylinders, the top bearing on said standard being adapted to only partly surround the shaft to permit the lateral detachment of the shaft therefrom, substantially as described.

In testimony whereof I affix my signature.

QUILLAIN R. MURPHY.

Witness:
 NOMIE WELSH.

Copies of this patent may be obtained for five cents each, by addressing the "Commissioner of Patents, Washington, D. C."